United States Patent [19]

Masuda

[11] Patent Number: 4,587,937
[45] Date of Patent: May 13, 1986

[54] AUTOMATIC SPEED CONTROL SYSTEM FOR MOTORCYCLES

[75] Inventor: Yutaka Masuda, Fukuroi, Japan

[73] Assignee: Yamaha Hatsudoki Kabushiki Kaisha, Japan

[21] Appl. No.: 645,486

[22] Filed: Aug. 29, 1984

[30] Foreign Application Priority Data

Aug. 31, 1983 [JP] Japan ................................ 58-160038

[51] Int. Cl.⁴ ............................................ F02D 31/00
[52] U.S. Cl. .................................... 123/349; 123/360; 123/378
[58] Field of Search ............... 123/349, 359, 360, 376, 123/378, 389; 180/170, 175–179; 74/506, 489

[56] References Cited

U.S. PATENT DOCUMENTS 3,997,019  12/1976  Inoue ................................. 123/376
4,245,713   1/1981  Mochida et al. .................... 123/398

FOREIGN PATENT DOCUMENTS 2059229   1/1973  Fed. Rep. of Germany ...... 123/389

Primary Examiner—William A. Cuchlinski, Jr.
Attorney, Agent, or Firm—Ernest A. Beutler

[57] ABSTRACT

An automatic speed control mechanism for a motorcycle embodying an actuator device for automatically positioning the throttle of the engine. The automatic device is able to generate sufficient force so as to overcome the normal closing bias of the throttle but has insufficient force to resist throttle closing movement of the manual actuator so that the operator may manually override the automatic speed control and reduce the speed of the motorcycle.

18 Claims, 3 Drawing Figures

AUTOMATIC SPEED CONTROL SYSTEM FOR MOTORCYCLES

BACKGROUND OF THE INVENTION

This invention relates to an automatic speed control system for motorcycles and more particularly to an improved arrangement for facilitating the release of the automatic speed control.

The use of automatic speed control devices, commonly called cruise controls, has been widely accepted with automobiles. Such devices employ an automatically controlled driving member for positioning the throttle of the engine so as to maintain a preset speed. The drive member may be deactuated in a number of ways so as to permit the vehicle to be returned to manual control. Normally such things as brake or clutch pedal operated switches or manually operated switches are employed so as to facilitate deactivation of the automatic speed control.

Many of the advantages of automatic speed control devices can also be realized in conjunction with motorcycles. In fact, in some instances, an automatic speed control has even more advantages with a motorcycle than with an automobile. However, the motorcycle throttle control is normally operated by a rotatably supported handgrip and the rider normally maintains his hand on the handgrip even when operating under speed control modes. It is desirable if the speed control can be deactivated by rotating the accelerator grip in a throttle closing condition. However, with the types of automatic speed controls used in automobiles, this is not possible. Where such a deactivation device is employed, it should not adversely affect the normal operation of the accelerator handgrip. That is, the normal "feel" of the accelerator control should be maintained.

It is, therefore, a principal object of this invention to provide an improved automatic speed control device for a motorcycle.

It is a further object of this invention to provide an automatic speed control device for a motorcycle that facilitates deactivation by the operator controlled throttle.

It is a further object of this invention to provide an improved arrangement for coupling the driving member of the automatic speed control device to the throttle mechanism so as to not interfere with the normal manual operator control and so as to permit deactivation when the manual operator control is moved in a closing direction.

SUMMARY OF THE INVENTION

This invention is adapted to be embodied in an automatic speed control mechanism for a motorcycle or the like comprising a throttle that is movable in opening and closing directions for controllig the speed of the motorcycle. An operator actuated speed control is movable in opening and closing direcitons and connecting means positively couple the operator actuated speed control to the throttle for opening and closing the throttle. Actuating means are also incorporated for automatically positioning the throttle valve. The actuating means is operative to provide a force sufficient to move the throttle in its opening position but less than that exerted by the operator actuated speed control in its closing direction so that the operator actuated speed control can override the automatically operated actuating means.

DETAILED DESCRIPTION OF THE PREFERRED EMBODIMENT

Figure 1:
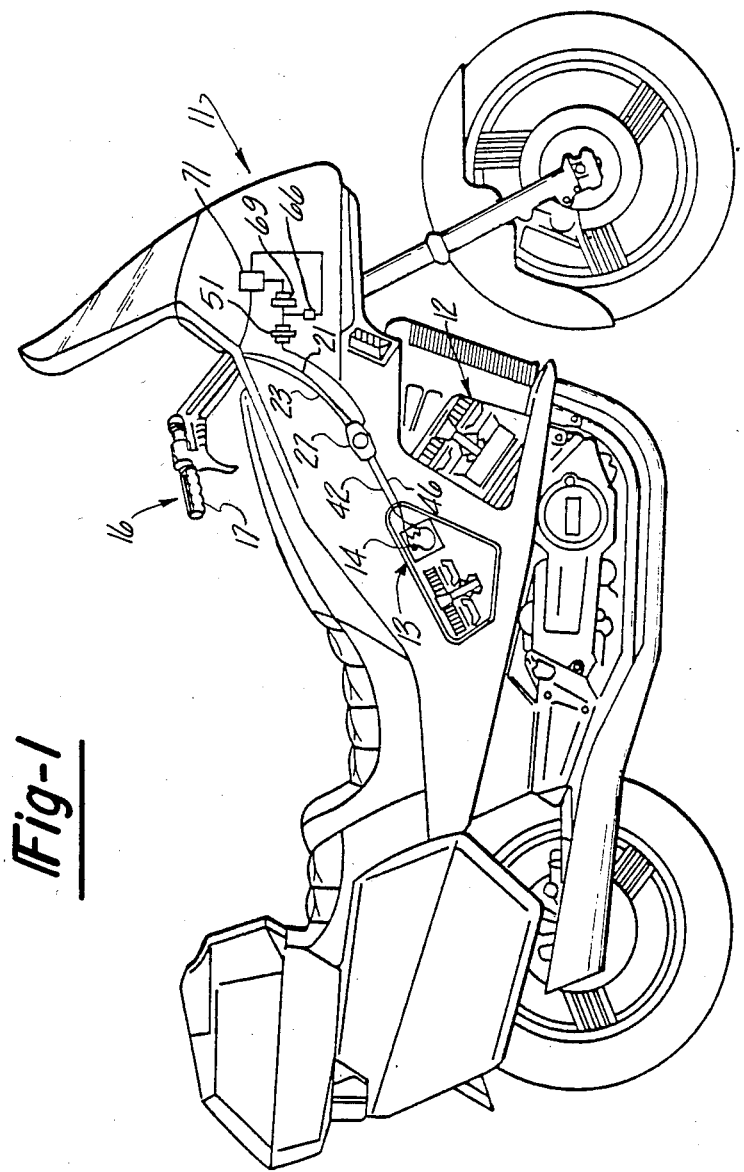
FIG. 1 is a side elevational view of a motorcycle having an automatic speed control mechanism constructed in accordance with an embodiment of the invention.

In the drawings, the reference numeral 11 indicates generally a motorcycle having a speed control mechanism constructed in accordance with the invention. The motorcycle 11 includes an engine, indicated generally by the reference numeral 12, which has an engine speed control device. In the illustrated embodiment, the engine 12 is of the type that includes one or more carburetors, indicated generally by the reference numeral 13, and which includes a throttle valve 14 that is rotatably journaled on a throttle valve shaft 15 for controlling the speed of the associated engine 12 in a known manner.

The motorcycle 11 is equipped with a handbar assembly 16 that carries at one of its ends a rotatable accelerator grip 17. The accelerator grip 17 is juxtaposed to a control box 18 that contains a speed control switch 19 and a kill switch 21. The kill switch 21 is provided for selectively disabling or stopping the engine 12. The speed control switch 19, as will become apparent, is operative to control an automatic speed control for controlling the speed of the engine 12 in a manner to be described.

Within the control box 18, the accelerator grip 17 is provided with a cam member 22 that is rotatably affixed to the accelerator grip 17. A throttle opening control wire 23 is provided that is comprised of a wire actuator 24 that has one of its ends affixed to the cam 22, as by a ferrule 25. The bulk of the length of the wire 24 is surrounded by a protective sheath 26. The opposite end of the wire 24 passes into a coupling device, indicated generally by the reference numeral 27, and which includes a rotatable control member 28. This end of the wire 24 is affixed to the rotatable control member 28, as by means of a ferrule 29. In this way, motion may be transmitted from the accelerator grip 16 to the control member 28 in a throttle opening direction, as will be described. The controll member 28 is rotatably journaled in a suitable manner in a casing 31 of the coupling device 27.

A throttle closing wire, indicated generally by the reference numeral 32, has a wire actuator 33 which is connected at one of its ends to the cam 22 by means of a ferrule 37. Like the throttle opening wire actuator 23, the major portion of the length of the control wire 36 is encircled by a protective sheath 38. The opposite end of the throttle closing wire 36 is connected to the control member 28 by means of a ferrule 39.

Figure 3:
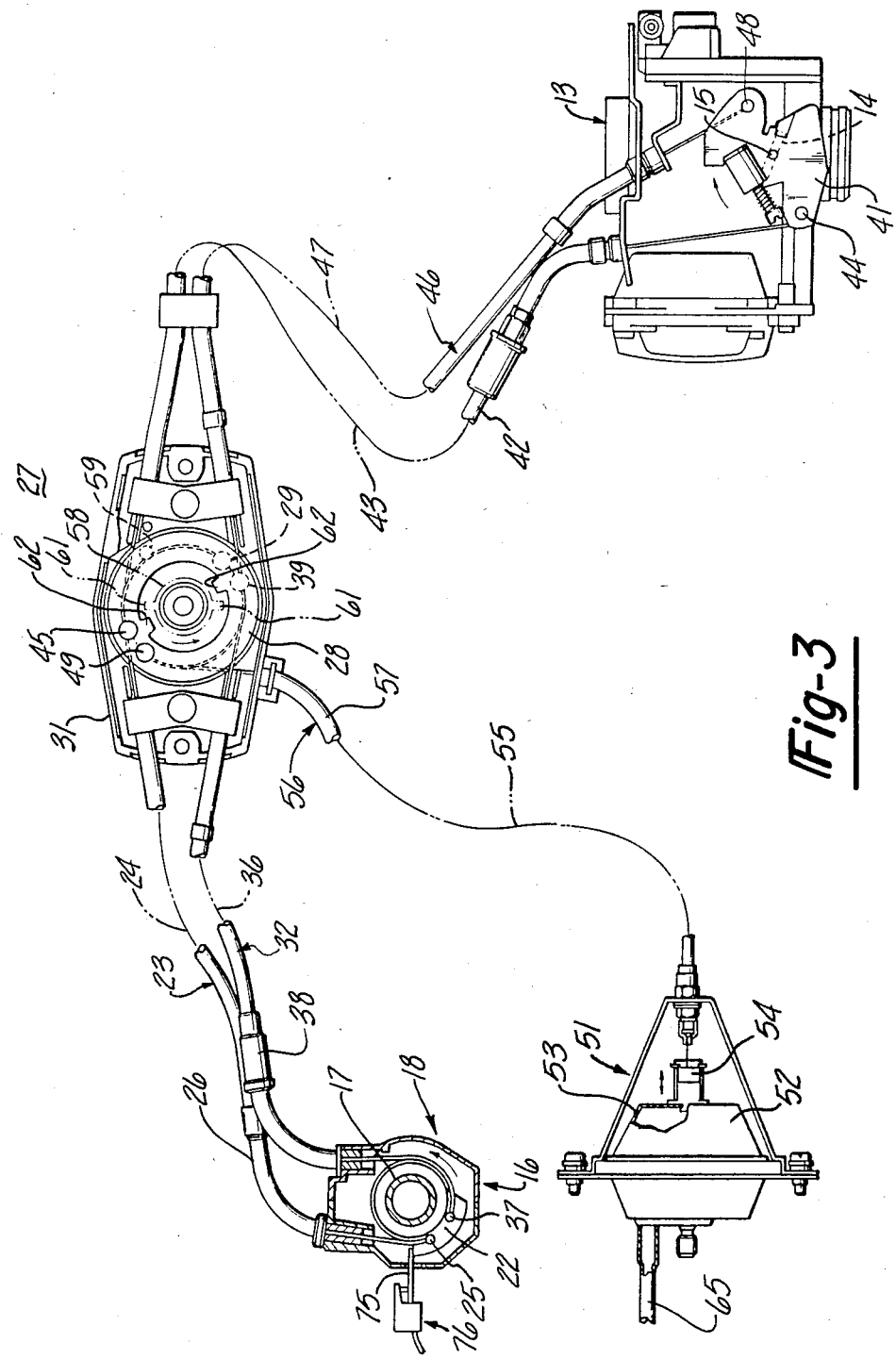
FIG. 3 is a partially schematic perspective view showing the construction of the throttle actuating mechanism of the embodiment.

Rotation of the accelerator grip 16 in a counterclockwise direction as viewed in FIG. 3 places a tension on the throttle opening wire 24 which will rotate the control member 28 also in a clockwise direction. This direction is indicated by the solid arrow in FIG. 3. Rotation in the opposite direction will tension the throttle closing wire 36 and will rotate the control 28 in a throttle closing direction.

An actuating lever 41 is affixed to the throttle valve shaft 15 for rotatably positioning the throttle valve 14. A throttle opening control wire, indicated generally by the reference numeral 42, has a control wire 43 that is affixed at one of its ends to the lever 41 by means of a ferrule 44. The opposite end of the throttle opening control wire 43 is affixed to the control member 28 by means of a ferrule 45.

A throttle closing control wire assembly, indicated generally by the reference numeral 46, has a throttle closing control wire 47 that is affixed at one end to the lever 41 at a point spaced on the opposite side of the ferrule 44 by means of a ferrule 48. In addition, a throttle closing return spring (not shown) is provided that is operative on the lever 41 for biasing the throttle valve 14 to its closed or idle position. The opposite end of the throttle closing control wire 47 is affixed to the control member 28 by means of a ferrule 49.

Because of the aforedescribed connection, rotation of the control member 28 in a counterclockwise direction causes a tension to be exerted on the throttle opening control wire 43 so as to rotate the lever 41 and throttle valve 14 in a clockwise or opening direction. Clockwise rotation of the control member 28 will cause the throttle closing control wire 47 to be tensioned and rotate the lever 41 and throttle valve 14 in the closing direction. As has been previously noted, this rotation is also assisted by the return spring. It should be readily apparent, therefore, that a positive connection is provided between the accelerator grip 17 and the carburetor throttle valve 14 so that these two elements will be interdependent upon each other for their positioning.

In accordance with the invention, the motorcycle 11 is also provided with an automatic speed control including an actuator device, indicated generally by the reference numeral 51. The actuator device 51 is comprised of a vacuum motor 52 that includes a diaphgram 53 that is connected by means of a connector 54 to one end of a control wire 55 of a automatic control wire assembly, indicated generally by the reference numeral 56. The major portion of the length of the control wire 55 is encircled by a protective sheath 57. The opposite end of the control wire 55 extends into the coupling device 27 and is specifically connected to an actuating element 58 that is journaled within the housing 31 for rotation relative to the control member 28 in an appropriate manner. A ferrule 59 provides the connection between the actuating wire 55 and the actuating element 58. The actuating element 58 is provided with a pair of lugs 61 that are adapted to engage, at times, lugs 62 formed on the control member 28. The lugs 61 and 62 provide, in effect, a lost motion connection between the actuating element 58 and the control member 28 so that the control member 28 may freely move in a throttle opening direction without interference from the actuating element 58. However, rotation of the actuating element 58 in the throttle opening position will cause the lugs 61 to engage the lugs 62 and to open the throttle valve 14 in a manner to be described.

Figure 2:
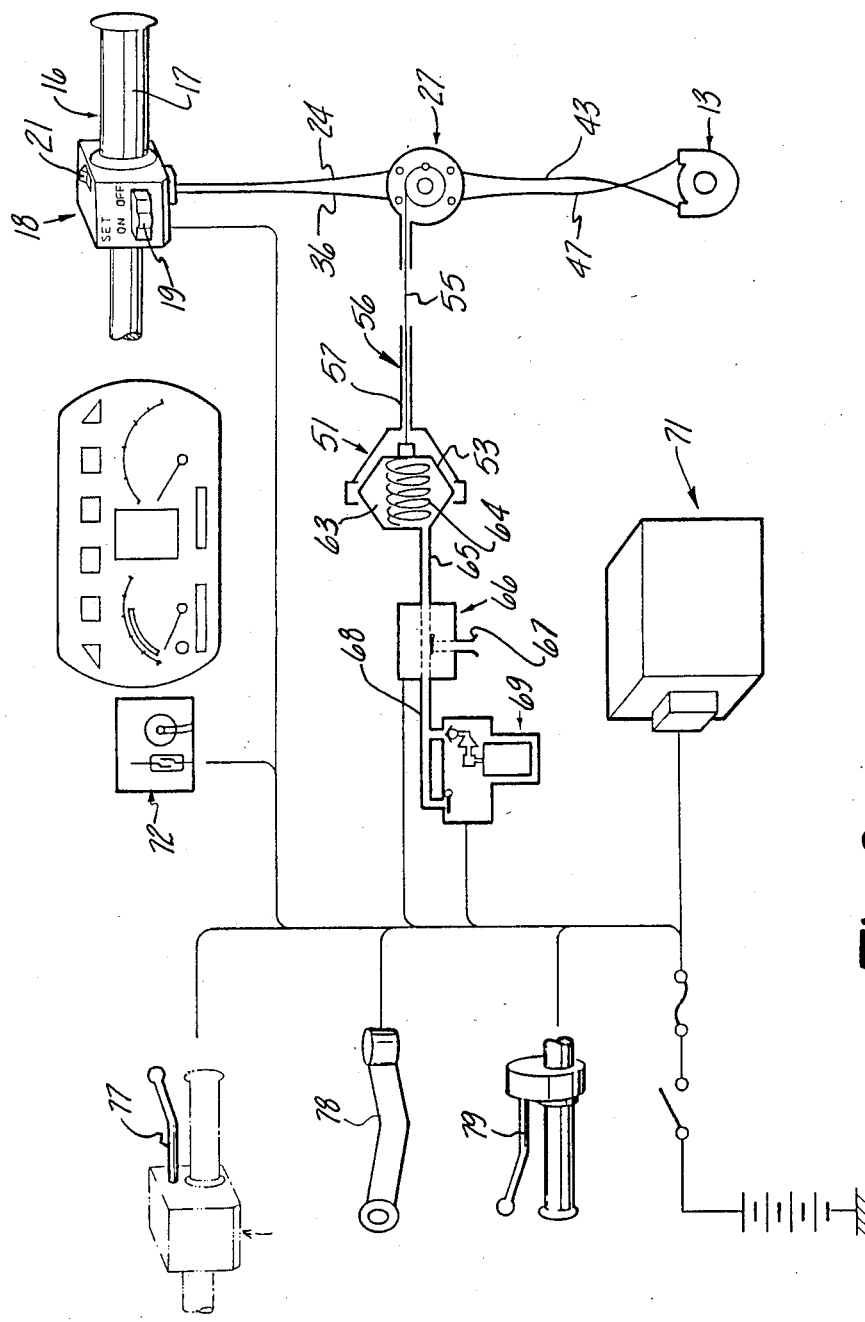
FIG. 2 is a partially schematic view showing the automatic speed control mechanism and its various controls.

Referring now primarily to FIG. 2, the actuating device 51 and specifically the diaphgram 53 forms a chamber 63 in which a coil compression spring 64 is contained for normally urging the diaphgram 53 in a throttle closing direction. The chamber 63 is connected to a conduit 65 which extends from a control valve assembly 66. The control valve assembly 66 is adapted to connect the conduit 65 to either an atmospheric vent 67 or a vacuum line 68. The vacuum line 68 is fed by an electrically operated vacuum pump 69. The vacuum pump 69 and control valve 66 are controlled by a control box 71 that is operative so as to control the vacuum pump 69 and valve 66 when actuated so as to maintain a preset vehicle speed.

This is achieved in the following manner. When the operator decides to control the motorcycle 11 in an automatic speed control mode, the set switch 19 is closed. At this time a comparator, indicated generally by the reference numeral 72, will note the actual speed of travel of the motorcycle 11 and provide a signal to the control box 71 of the preset speed. The vacuum pump 69 and control valve 66 will then be set so as to actuate the vacuum motor 52 and move the diaphragm 53 so that the wire 55 is tensioned and rotate the actuating element 58 so as to rotate the control member 28 to maintain the throttle valve 14 in the preset position necessary to maintain the desired vehicle speed. The mechanism for achieving this control is well known and, therefore, is not described in any further detail.

It should be noted that the vacuum motor 52 exerts sufficient force on the control member 28 and on the throttle valve 15 so as to overcome the force of the return spring. Thus, it is possible to maintain automatic speed control under this mode.

If the operator desires to activate the automatic speed control, this may be done in any of a number of ways. In addition, the operator can override the automatic speed control and cause deceleration of the engine 12 and motorcycle 11 even when still operating in the automatic mode. This later operation will be described first.

As has been previously noted, the accelerator grip 17 is directly coupled to the throttle valve 14 through the control wire arrangement previously described. Thus, if the operator rotates the accelerator grip 17 in a throttle closing direction, even when the automatic speed control is engaged, the throttle closing wire 36 will be tensioned and the control member 28 will be rotated in a clockwise direction. This is possible since the force exerted by the operator control is greater than the force exerted by the automatic speed control and specifically the vacuum motor 52. That is, the throttle closing force exerted by the operator is exerted on the control wire 36 through the lever arm $R_2$ which is the radius from the point of rotation of the throttle grip 17 to the ferrule 37. In addition, the operator force is equal to his force times the moment arm $R_3$ which is the radius to the throttle grip. In addition, the return spring acts on the throttle lever 14 so as to urge it in a closing direction and the closing force on the throttle valve from the throttle closing wire operates through a radius $R_1$ which is the lever arm of this mechanism. Therefore, the following relationship exists:

$$N_3 \cdot R_3 / R_2 > N_2.$$

In the foregoing equation, the returning force on the accelerator grip by the operator is $N_3$ and the various radii are those noted. The force $N_2$ is the force of the actuator 52 and is less than that of the throttle closing force. Therefore, the operator is able to overcome the actuator 52 and effect manual throttle closing even when the automatic speed control is set.

If the operator wishes to completely deactivate the automatic speed control, he need merely rotate the accelerator grip 17 to the idle position wherein the cam 22 will engage a contact 75 of a disable switch 76 of the speed control. Then, the control unit 71 will be automatically deactivated. This switch 76 is contained within the control box 18 and is sealed within it. Alternatively, the disable switch may be mounted on the carburetor 13 so as to be engaged by the lever 41 when it is moved to its idle position as shown in the broken line view in this figure.

In addition to the disabling of the automatic speed control by moving of the manual throttle to its idle position, it is also possible to disable it by operating the front hand brake control 77, the rear brake control 78 or the clutch control 79. These disabling switches are all of a known type and are operated in the control circuit with the control box 71 in a known manner.

It should be readily apparent that the described arrangement permits a very effective speed control for a motorcycle and further permits the operator to manually override the speed control and reduce the speed of the vehicle without disabling the automtic speed control. In addition, the automatic speed control may be switched off in any of a plurality of manners. When this is done, the control device 71 shuts off the vacuum pump 69 and opens the valve 66 to the atmospheric vent 67 so as to disable the vacuum motor 52.

Although an embodiment of the invention has been illustrated and described, various changes and modifications may be made without departing from the spirit and scope of the invention, as defined by the appended claims.

I claim:

1. An automatic speed control mechanism for a motorcycle or the like comprising a throttle movable in opening and closing directions for controlling the speed of the motorcycle, an operator actuated speed control movable by the operator in either of a selected opening and closing direction, connecting means for positively coupling said operator actuated speed control to said throttle for said throttle opening when an operator moves said operator actuated speed control in the opening direction and for positively closing said throttle when an operator moves said operator actuated speed control in the closing direction, and actuator means for automatically positively positioning said throttle, sad actuator means being operative to provide a force sufficient to move said throttle in its opening position but less than the force exerted by said operator actuated speed control in its closing direction for manual override and reduction of the speed regardless of the position of the actuator means.

2. An automatic speed control mechanism as set forth in claim 1 wherein the actuator means is connected to the throttle through a lost motion connection.

3. An automatic speed control mechanism as set forth in claim 1 further including automatic control means for automatically setting the actuator means for positioning the throttle.

4. An automatic speed control mechanism as set forth in claim 3 further including disabling means for disabling the automatic control means.

5. An automatic speed control mechanism as set forth in claim 4 wherein the disabling means is responsive to another control of the motorcycle or the like.

6. An automatic speed control mechanism as set forth in claim 5 wherein the actuator means is connected to the throttle through a lost motion connection.

7. An automatic speed control mechanism as set forth in claim 1 wherein the connecting means comprises a throttle opening flexible transmitter operatively connected to the operator actuated speed control and the throttle for positively opening the throttle and a throttle closing flexible transmitter operatively connected between said operator actuated speed control and said throttle valve for positively closing said throttle valve.

8. An automatic speed control mechanism as set forth in claim 7 wherein the actuator means is connected to the throttle through a lost motion connection.

9. An automatic speed control mechanism as set forth in claim 8 further including automatic control means for automatically setting the actuator means for positioning the throttle.

10. An automatic speed control mechanism as set forth in claim 9 further including disabling means for disabling the automatic control means.

11. An automatic speed control mechanism as set forth in claim 10 wherein the disabling means is responsive to another control of the motorcycle or the like.

12. An automatic speed control mechanism as set forth in claim 11 wherein the actuator means is connected to the throttle through a lost motion connection.

13. An automatic speed control mechanism for a motorcycle or the like comprising a throttle movable in opening and closing directions for controlling the speed of the motorcycle, an operator actuated speed control movable in an opening and closing direction, connecting means for positively coupling said operator actuated speed coantrol to said throttle for opening and closing said throttle, actuator means for automatically positioning said throttle for maintaining a preset vehicle speed, and manual override means for permitting the operator to reduce the speed of the vehicle by actuation of said operator actuated speed control in its closing direction independent of the condition of the actuator means.

14. An automatic speed control mechanism as set forth in claim 13 wherein the actuator means is connected to the throttle through a lost motion connection.

15. An automatic speed control mechanism as set forth in claim 13 further including automatic control means for automatically setting the actuator means for positioning the throttle.

16. An automatic speed control mechanism as set forth in claim 15 further including disabling means for disabling the automatic control means.

17. An automatic speed control mechanism as set forth in claim 16 wherein the disabling means is responsive to another control of the motorcycle or the like.

18. An automatic speed control mechanism as set forth in claim 17 wherein the actuator means is connected to the throttle through a lost motion connection.

* * * * *